US012770305B2

(12) United States Patent
Geng et al.

(10) Patent No.: US 12,770,305 B2
(45) Date of Patent: Oct. 20, 2026

(54) ONE-STEP DIFFUSION DISTILLATION VIA DEEP EQUILIBRIUM MODELS

(71) Applicant: ROBERT BOSCH GMBH, Stuttgart (DE)

(72) Inventors: Zhengyang Geng, Stuttgart (DE); Ashwini Polke, Stuttgart (DE); Jeremy Kolter, Pittsburgh, PA (US); Bahare Azari, San Jose, CA (US); Ivan Batalov, Pittsburgh, PA (US); Filipe Condessa, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 441 days.

(21) Appl. No.: 18/332,355

(22) Filed: Jun. 9, 2023

(65) Prior Publication Data

US 2024/0412430 A1 Dec. 12, 2024

(51) Int. Cl.
*G06T 11/60* (2026.01)
*G06T 5/70* (2024.01)

(52) U.S. Cl.
CPC ................ *G06T 11/60* (2013.01); *G06T 5/70* (2024.01); *G06T 2207/20084* (2013.01)

(58) Field of Classification Search
CPC . G06T 11/60; G06T 5/70; G06T 2207/20084; G06T 3/4046; G06T 5/60; G06T 9/002; G06T 2207/20076; G06T 2207/20081; G06T 3/0453; G06T 2200/28; G06T 2207/20221; G06T 79/00; G06N 3/0455; G06N 3/0495; G06N 3/084; G06N 3/096; G06N 3/045; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06V 10/454; G06V 10/54; G06V 10/7764; G06V 10/774; G06V 10/82; G06V 10/84; G06V 20/41; G06V 30/18057; G06V 20/698; G06V 30/19173; G06F 18/214; G06F 18/22; G06F 18/241; G06F 18/24; G06F 18/2411; G06F 18/2415; G06F 30/27; Y10S 128/925
See application file for complete search history.

(56) References Cited

U.S. PATENT DOCUMENTS

| | | | | |
|---|---|---|---|---|
| 11,908,180 | B1 * | 2/2024 | Ho | G06V 10/82 |
| 2021/0319324 | A1 * | 10/2021 | Mueller | G06N 3/063 |
| 2022/0108212 | A1 * | 4/2022 | Zhai | G06F 17/14 |
| 2023/0376769 | A1 * | 11/2023 | Ghaffari | G06F 7/483 |
| 2023/0377099 | A1 * | 11/2023 | Kreis | G06N 3/0475 |
| 2024/0096115 | A1 * | 3/2024 | Molchanov | G06V 40/171 |
| 2024/0320789 | A1 * | 9/2024 | Hinz | G06T 3/4046 |
| 2024/0338799 | A1 * | 10/2024 | Li | G06F 40/126 |
| 2026/0105646 | A1 * | 4/2026 | Aggarwal | G06T 11/00 |

(Continued)

OTHER PUBLICATIONS

63406175, Specification, Sep. 13, 2022 (Year: 2022).*

(Continued)

*Primary Examiner* — Jose L Couso
(74) *Attorney, Agent, or Firm* — Brooks Kushman P.C.

(57) ABSTRACT

Generative equilibrium transformers are disclosed. Disclosed embodiments provide a simple and effective technique that can distill a multi-step diffusion process into a single-step generative model using solely noise/image pairs.

20 Claims, 3 Drawing Sheets

(56) References Cited

U.S. PATENT DOCUMENTS

2026/0105661 A1* 4/2026 Zhao ...................... G06T 11/60

OTHER PUBLICATIONS

63406175, Drawings-only_black_and_white_line_drawings, Sep. 13, 2022 (Year: 2022).*

Ba, J. L. et al., "Layer Normalization," Jul. 21, 2016, 14 pages, https://arxiv.org/abs/1607.06450.

Bai, S. et al., "Deep Equilibrium Models," 33rd Conference on Neural Information Processing Systems (NeurIPS 2019), Dec 8, 2019, 12 pages, https://arxiv.org/pdf/1909.01377.

Dosovitskiy, A. et al., "An Image is Worth 16x16 Words: Transformers for Image Recognition at Scale," International Conference on Learning Representations, Jun. 3, 2021, 22 pages, https://arxiv.org/abs/2010.11929.

Geng, Z. et al., "On Training Implicit Models," 35th Conference on Neural Information Processing Systems (NeurIPS 2021), Jan. 12, 2022, 24 pages, https://arxiv.org/abs/2111.05177.

Karras, T. et al., "Elucidating the Design Space of Diffusion-Based Generative Models," 36th Conference on Neural Information Processing Systems (NeurIPS 2022), Oct. 11, 2022, 47 pages, https://arxiv.org/abs/2206.00364.

Lu, C. et al., "DPM-Solver: A Fast ODE Solver for Diffusion Probabilistic Model Sampling in Around 10 Steps," 36th Conference on Neural Information Processing Systems (NeurIPS 2022), Oct. 13, 2022, 31 pages, https://arxiv.org/ abs/2206.00927.

Luhman, E. et al., "Knowledge Distillation in Iterative Generative Models for Improved Sampling Speed," Jan. 7, 2021, 20 pages, https://arxiv.org/abs/2101.02388.

Meng, C. et al., "On Distillation of Guided Diffusion Models," 2023 IEEE/CVF Conference on Computer Vision and Pattern Recognition (CVPR) Recognition, Aug. 22, 2023, 10 pages.

Nichol, A., et al., "Improved Denoising Diffusion Probabilistic Models," Proceedings of the 38th International Conference on Machine Learning, Feb. 2021, 10 pages, https://arxiv.org/abs/2102.09672.

Peebles, W., et al., "Scalable Diffusion Models with Transformers," Mar. 2, 2023, 25 pages, https://arxiv.org/abs/2212.09748.

Salimans, T., et al., "Progressive Distillation for Fast Sampling of Diffusion Models," International Conference on Learning Representations 2022, Jun. 7, 2022, 21 pages, https://arxiv.org/abs/2202.00512.

Song, J., et al., "Denoising Diffusion Implicit Models," International Conference on Learning Representations 2021, Oct. 5, 2022, 22 pages, https://arxiv.org/abs/2010.02502.

Song, Y., et al., "Score-Based Generative Modeling through Stochastic Differential Equations," International Conference on Learning Representations 2021, Feb. 10, 2021, 36 pages, https://arxiv.org/abs/2011.13456.

Vaswani, A., et al., "Attention Is All You Need," 31st Conference on Neural Information Processing Systems (NIPS 2017), Dec 4, 2017, 11 pages.

Zheng, H., et al., "Fast Sampling of Diffusion Models via Operator Learning," Jan. 31, 2023, 12 pages, https://arxiv.org/abs/2211.13449.

* cited by examiner

ONE-STEP DIFFUSION DISTILLATION VIA DEEP EQUILIBRIUM MODELS

TECHNICAL FIELD

The present disclosure relates to the distillation of diffusion models. In disclosed embodiments, a deep equilibrium model may be utilized in a distilled architecture. Disclosed embodiments may enable distilling diffusion models directly from initial noise to a resulting image.

BACKGROUND

Diffusion models have shown exceptional performance across a broad spectrum of generative tasks, including high-quality image generation, audio, and video synthesis. Knowledge distillation refers to the process of transferring knowledge from a large model or set of models to a single smaller (and faster) model that can be practically deployed under real-world constraints. Knowledge distillation may be viewed as a form of model compression.

SUMMARY

A key drawback of diffusion models is their slow generative process restricting the practical applicability of diffusion models in real-time or resource-constrained scenarios. Existing distillation methods for diffusion models aim to condense the multi-step sampling process into a more efficient few-step or single-step process. However, these methods suffer from the drawback of demanding multiple training passes to distill the lengthy sampling process and they require large memory and computing resources due to maintaining a dual copy of the model. Disclosed embodiments may distill a multi-step diffusion process into a single-step generative model, using solely noise/image pairs.

In some embodiments, disclosed methods comprise converting noise into a noise embedding vector; tokenizing the noise embedding vector via an injection transformer; inputting the tokenized noise into an equilibrium transformer; solving a fixed point via the equilibrium transformer; and decoding the fixed point to generate an image sample.

DETAILED DESCRIPTION

Figure 1:
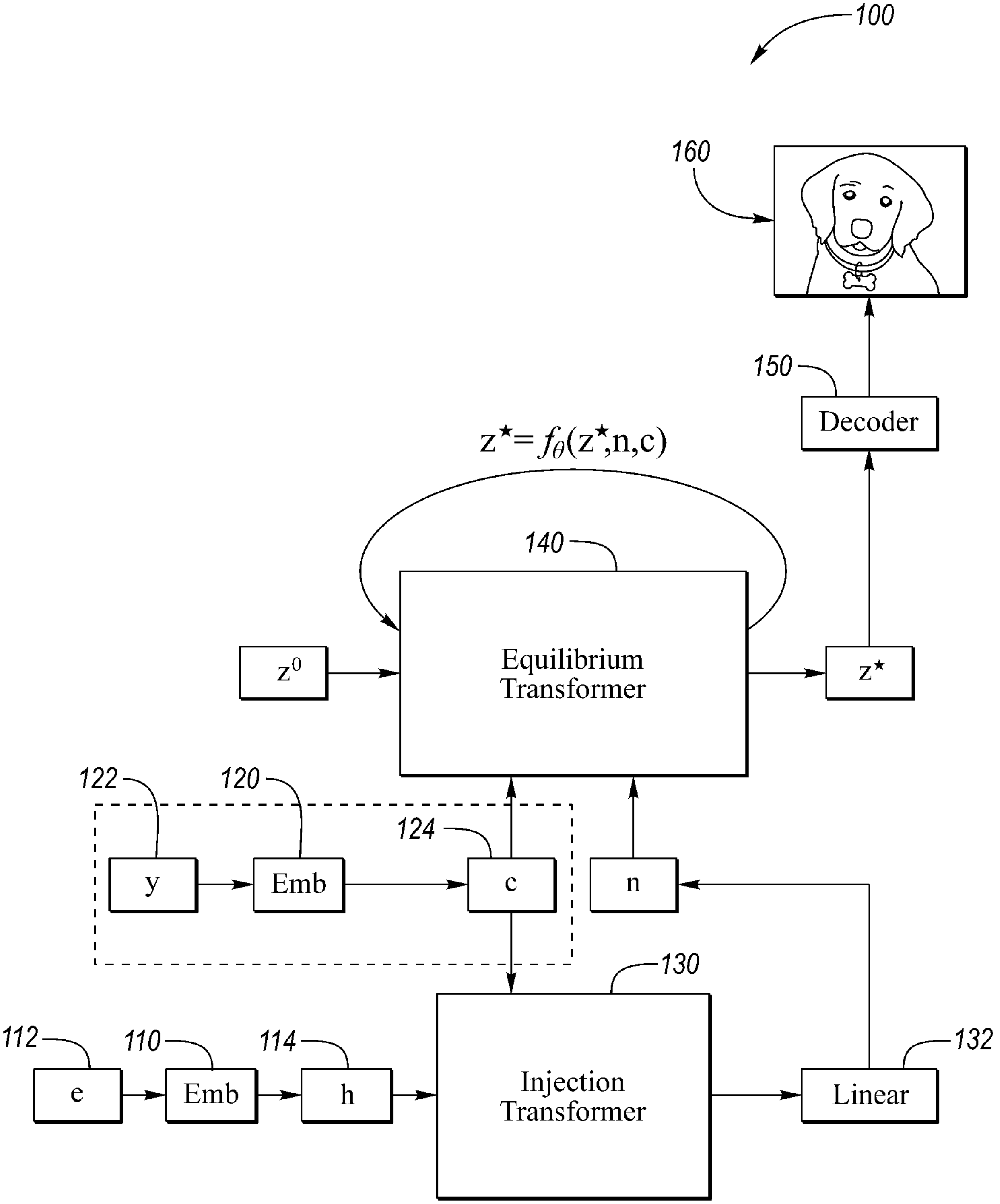
FIG. 1 illustrates an example embodiment for generating image samples in accordance with the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Diffusion models have demonstrated remarkable performance on a wide range of generative tasks such as high-quality image generation and manipulation, audio synthesis, video, 3D shape, text, and molecule generation. These models are trained with a denoising objective derived from score matching, variational inference, or optimal transport, enabling them to generate clean data samples by progressively denoising the initial Gaussian noise during the inference process. Unlike adversarial training, the denoising objective leads to a more stable training procedure, which in turn allows diffusion models to scale up effectively. Despite the promising results, one major drawback of diffusion models is their slow generative process, which often necessitates hundreds to thousands of model evaluations. This computational complexity limits the applicability of diffusion models in real-time or resource-constrained scenarios.

In an effort to speed up the slow generative process of diffusion models, researchers have proposed distillation methods aimed at distilling the multi-step sampling process into a more efficient few-step or single-step process. However, these techniques often come with their own set of challenges. The distillation targets must be carefully designed to successfully transfer knowledge from the larger model to the smaller one. Further, distilling a long sampling process into a few-step process often calls for multiple training passes. Most of the prevalent techniques for online distillation require maintaining dual copies of the model, leading to increased memory and computing requirements. As a result, there is a clear need for more streamlined and efficient approaches that address the computational demands of distilling diffusion models without sacrificing the generative capabilities.

One proposed technique of knowledge distillation distills a multi-step Denoising Diffusion Implicit Model ("DDIM") sampler into a single-step sampler by training the student model on one million synthetic image samples. Other techniques, such as progressive distillation, aim to distill a T-step teacher DDIM into a new T/2 step student DDIM, repeating this process until one-step models are achieved. Transitive closure time-distillation generalizes progressive distillation to distill N>2 steps together at once to reduce the overall number of training phases. Consistency models achieve online distillation in a single pass by taking advantage of a carefully designed teacher and distillation loss objective. Diffusion Fourier neural operator ("DFNO") maps the initial Gaussian distribution to the solution trajectory of the reverse diffusion process by inserting the temporal Fourier integral operators in the pretrained U-Net backbone. Another approach proposes to distill classifier-free guided diffusion models into few-step generative models by first distilling a combined conditional and unconditional model, and then progressively distilling the resulting model for faster generation.

While distillation may be an effective approach to speed up sampling rate of existing diffusion models, there are alternate lines of work to reduce the length of sampling chains by considering alternate formulations of diffusion model, correcting bias and truncation errors in the denoising process, and through training-free fast samplers at inference.

Several works like DDIM, Improved DDPM, FastDPM, SGM-CLD, and EDM modify or optimize the forward diffusion process so that the denoising process can be made more efficient. For example, DDIM is based on a non-Markovian definition of the diffusion processes that has the same training objective, but whose reverse process is much faster to sample from. DPM-Solver, and GENIE are higher-order ordinary differential equations ("ODE") solvers that generate samples in few steps. There are also approaches that combine diffusion models with other families of generative models for faster sampling.

It is an objective of the present disclosure to streamline the distillation process of diffusion models while retaining perceptual quality of images generated by the original model. Disclosed embodiments may exhibit enhancements over previous approaches. Disclosed embodiments may comprise a simple and effective technique that may distill a multi-step diffusion process into a single-step generative model using solely noise/image pairs. Disclosed embodiments may include an architecture comprising a novel Deep Equilibrium ("DEQ") model, which may be referred to herein as a Generative Equilibrium Transformer ("GET"). In some disclosed embodiments, GET may be interpreted as an infinite depth network using weight-tied transformer layers, which solve for a fixed point in the forward pass. Disclosed embodiments allow for adaptive application of these layers in the forward pass, striking a balance between inference speed and sample quality. Furthermore, disclosed embodiments incorporate an almost parameter-free class conditioning mechanism in the architecture, expanding its utility to class-conditional image generation.

Approaches for distillation disclosed herein, via noise/image pairs generated by a diffusion model, may be applied to both Vision Transformer ("ViT") and GET-based architectures. However, in disclosed embodiments, the GET-based architecture achieves substantially improved results with smaller architectures. The GET-based architecture may produce perceptual image quality on par with or superior to other complex distillation techniques, such as progressive distillation, in context of both conditional and unconditional image generation. In some embodiments, GET exhibits significantly better parameter and data efficiency compared to architectures like ViT, as GET matches the Frechet inception distance ("FID") scores of a 5× larger ViT, underscoring the transformative potential of GET in enhancing the efficiency of generative models.

Disclosed embodiments may be used to generate synthetic image datasets to train machine learning systems that can be used for any computer vision task, including: 1) computer-controlled machines, robots, vehicles, domestic appliances, power tools, manufacturing machines, personal assistants, and access control systems; and 2) systems for conveying information, such as surveillance systems or medical (imaging) systems. Disclosed embodiments may also be used to augment existing training datasets by generating additional images or by modifying the images in an existing dataset.

The slow generative process of diffusion models, requiring hundreds of model evaluations, limits their practicality in real-time or resource-constrained scenarios. With the goal to speed up the generative process, distillation methods have emerged that aim at distilling the multi-step sampling process into a more efficient few-step or single-step process. These methods are usually complex as they need multiple stages of training, the resulting distilled model may not retain the perceptual quality of the images generated by the original model, and in many established approaches there is a need to keep a dual copy of the model that in turn leads to memory increase.

Deep equilibrium ("DEQ") models (e.g., as described in Deep Equilibrium Models, Bai et al.) compute internal representations by solving for a fixed point in their forward pass. Specifically, consider a deep feedforward model with L layers:

$$z^{[i+1]} = f_\theta^{[i]}\left(z^{[i]}; x\right) \text{ for } i = 0, \ldots, L-1; \tag{1}$$

where $x \in \mathbb{R}^{n_x}$ is the input injection, $z^{[i]} \in \mathbb{R}^{n_z}$ is the hidden state of ith layer, and $$f_\theta^{[i]}:$$

$\mathbb{R}^{n_x \times n_z} \to \mathbb{R}^{n_z}$ is the feature transformation of the ith layer, parametrized by θ. If the above model is weight-tied, i.e., $$f_\theta^{[i]}$$

$=f_\theta$, $\forall i$, then in the limit of infinite depth, the output z[i] of this network approaches a fixed point z*:

$$\lim_{i \to \infty} f_\theta\left(z^{[i]}; x\right) = f_\theta(z^\star; x) = z^\star. \tag{2}$$

DEQs directly solve for this fixed point z* using black-box root finding algorithms like Broyden's method, or Anderson acceleration in the forward pass. As we cannot rely on explicit backpropagation through exact operations in the forward pass, DEQs utilize implicit differentiation to analytically differentiate through the fixed point. Let $g_\theta(z^*; x) = f_\theta(z^*; x) - z^*$, then the Jacobian of z* with respect to the model weights θ is given by $$\frac{\partial z^\star}{\partial \theta} = -\left(\frac{\partial g_\theta(z^\star, x)}{\partial z^\star}\right)^{-1} \frac{\partial f_\theta(z^\star; x)}{\partial \theta}. \tag{3}$$

Computing the inverse of the Jacobian can quickly become intractable while dealing with high-dimensional feature maps. The inverse-Jacobian term may be replaced with an identity matrix (i.e., a Jacobian-free or an approximate inverse-Jacobian) without affecting the final performance.

Diffusion models or score-based generative models progressively perturb images with an increasing amount of Gaussian noise and then reverse this process through sequential denoising to generate images. Specifically, consider a dataset of i.i.d. samples $p_{data}$, then the diffusion process $$\{x(t)\}_{t=0}^{T}$$

for $t \in [0, T]$ is given by an Itô stochastic differential equation ("SDE"):

$$dx = f(x, t)dt + g(t)dw \quad (4)$$

where w is the standard Wiener process, $f(\bullet, t):\mathbb{R}^d \rightarrow \mathbb{R}^d$ is the drifting coefficient, $g(\bullet):\mathbb{R} \rightarrow \mathbb{R}$ is the diffusion coefficient, and $x(0) \sim p_{data}$ and $x(T) \sim N(0, I)$. All diffusion processes have a corresponding deterministic process known as the probability flow ODE ("PF-ODE") whose trajectories share the same marginal probability densities as the SDE. This ODE can be written as:

$$dx = -\dot{\sigma}(t)\sigma(t)\nabla_x \log p(x, \sigma(t))dt \quad (5)$$

where $\sigma(t)$ is the noise schedule of diffusion process, and $\nabla_x \log p(x, \sigma(t))$ represents the score function. It has been shown that the optimal choice of $\sigma(t)$ in Eq. (5) is $\sigma(t)=t$. Thus, the PF-ODE can be simplified to $$\frac{dx}{dt} = -t\nabla_x \log p(x, \sigma(t)) = \frac{x - D_\theta(x; t)}{t}, \quad (6)$$

where $D_\theta(\bullet, t)$ is a denoiser function parametrized with a neural network that minimizes the expected $L_2$ denoising error for samples drawn from $p_{data}$. Samples can be efficiently generated from this ODE through numerical methods like Euler's method, Runge-Kutta method, and Heun's second-order solver.

Disclosed embodiments comprise a one-step distilled diffusion model, referred herein as GET. GET may comprise a DEQ vision transformer that may distill diffusion models into generative models that are capable of rapidly sampling images using only a single model evaluation. The GET model may map a set of Gaussian noises e and optional (indicate by a dotted box in FIG. 1) class labels y to images $\tilde{x}$.

Referring to FIG. 1, an embodiment of a GET-based architecture 100 may include an embedding network 110 for embedding noise 112, an embedding network 120 for embedding class labels 122, an injection transformer ("InjectionT") 130, and an equilibrium transformer ("EquilibriumT") 140. The embedding network 110 may embed the noise e 104 into embedding vector h 114 and embedding network 120 may embed class labels y 122 into embedding vector c as shown in accordance with equation (7).

$$h, c = Emb(e), Emb(y); \text{ if } y \neq 0 \quad (7)$$

The noise embedding network 110 may convert input noise $e \in \mathbb{R}^{H \times W \times C}$ into a sequence of two-dimensional ("2D") patches $p \in \mathbb{R}^{N \times (P^2 \cdot C)}$, where C is the number of channels, P is the size of patch, H and W denote the height and width of the original image, and $$N = \frac{HW}{P^2}$$

is the resulting number of patches. By adding standard sinusoidal position encoding, the noise embedding vector h is produced. Because the entire generative process is being directly distilled, time embedding t, that is common in standard diffusion models, is not needed.

The injection transformer 130, in accordance with equation (8), may transform tokenized noise (e.g., embedding vector h) to an intermediate representation n. In FIG. 1, the output is input into an optional linear component 132. The linear component 132 may perform a linear projection of the injection transformer 130 output for computing the intermediate representation n. Alternately, a linear component may be omitted or may be included in the injection transformer 132, which will then output the intermediate representation n. This intermediate representation n may be the input for the equilibrium transformer 140. The equilibrium transformer 140, in accordance with equation (9), may be an equilibrium layer. The equilibrium transformer 140 may solve the fixed point z* by taking in the noise injection n and an optional class embedding vector c.

$$n = InjectionT(h, c) \quad (8)$$

$$z^* = EquilibriumT(z^*, n, c) \quad (9)$$

Figure 2:
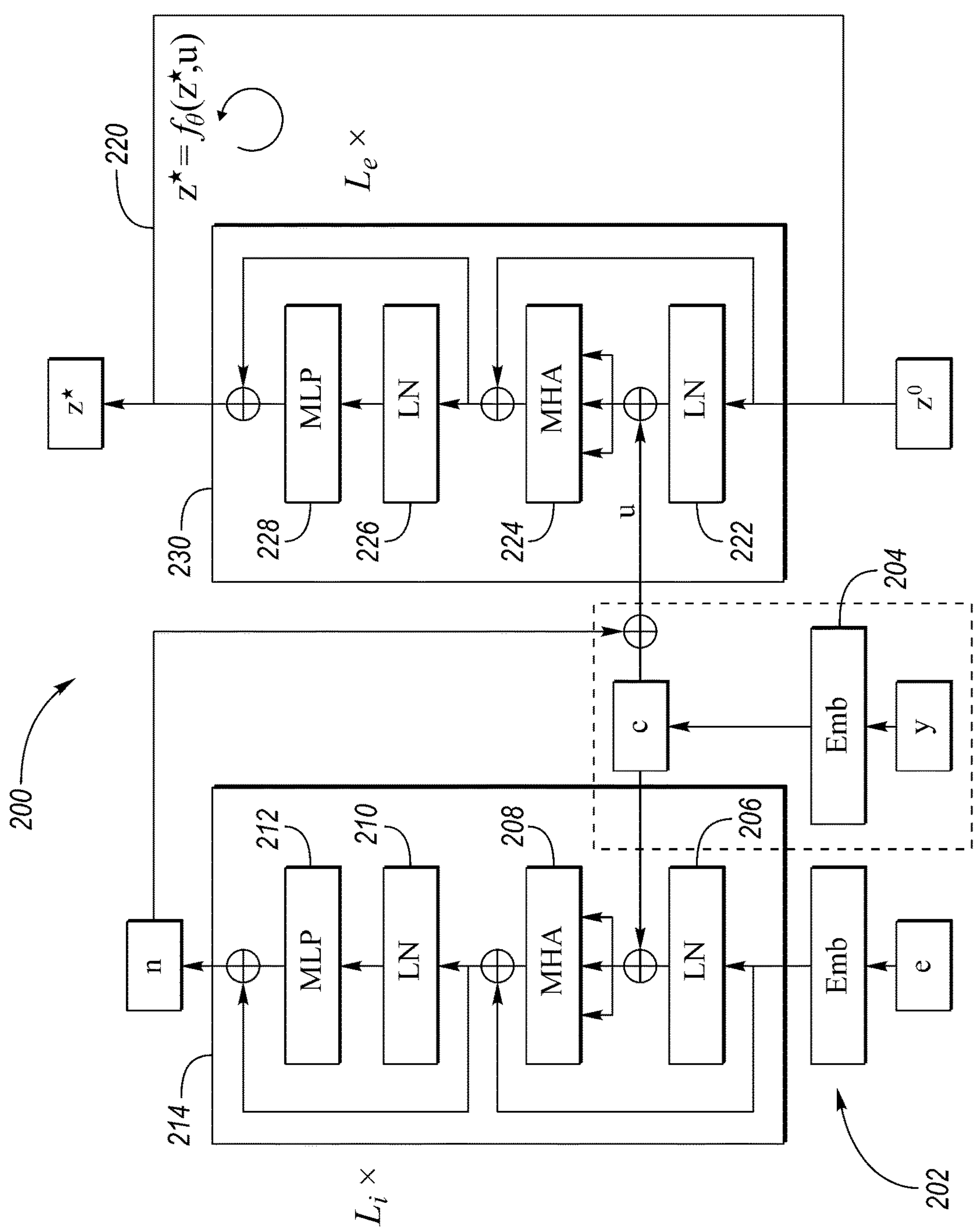
FIG. 2 illustrates an example embodiment for generating image samples in accordance with the present disclosure.

The injection transformer 130 and the equilibrium transformer 140 may be composed of a sequence of transformer blocks (i.e., GET blocks) that have similar block designs, for example, as illustrated in FIG. 2. Both the injection transformer 130 and the equilibrium transformer 140 may be composed of a sequence of GET blocks. The injection transformer 130 may be called only once to produce the noise injection n. The equilibrium transformer 140 defines a function $f_\theta$ of an implicit layer $z^*=f_\theta(z^*, n, c)$ that may be called multiple times, creating a weight-tied computational graph, until convergence.

GET blocks may utilize a similar block design for the noise injection (i.e., InjectionT) and the equilibrium layer (i.e., EquilibriumT), that may differ only at the injection interface. Specifically, the GET block may be built upon a standard Pre-LN transformer block, as shown below:

$$z = z + \text{Attention}(\text{LN}(z), u)$$

$$z = z + FFN(\text{LN}(z), u).$$

Here, $z \in \mathbb{R}^{N \times D}$ represents the latent token, $u \in \mathbb{R}^{N \times 3D}$ is the input injection, LN, FFN, and Attention respectively stand for Layer Normalization, a 2-layer Feed-Forward Network with a hidden dimension of size D×E, and an attention layer with an injection interface.

For GET blocks used in the injection transformer 130, u is equal to the class embedding token $c \in \mathbb{R}^{1 \times 3D}$ for conditional image generation. That is u=c for conditional models, and u=0 otherwise. For GET blocks in the equilibrium transformer, u is the broadcast sum of noise injection $n \in \mathbb{R}^{N \times D}$ and class embedding token $c \in \mathbb{R}^{1 \times 3D}$. That is, u=n+c for conditional models and u=n otherwise.

A standard transformer attention layer may be modified to incorporate an additive injection interface before query $q \in \mathbb{R}^{N \times D}$, key $k \in \mathbb{R}^{N \times D}$, and value $v \in \mathbb{R}^{N \times D}$, $$q, k, v, = zW_i + u$$

$$z = MHA(z, k, v)$$

-continued $$z = zW_o$$

where $W_i \in R^{D\times 3D}$ and $W_0 \in R^{D\times D}$. The injection interface enables interactions between the latent tokens and the input injection in the multi-head dot-product attention ("MHA") operation, $$qk^T = (zW_q + u_q)(zW_k + u_k)^T = zW_qW_k^Tz^T + zW_qu_k^T + u_qW_q^Tz^T + u_q^Tu_k,$$

where $W_q$, $W_k \in R^{D\times D}$ are slices from $W_i$, and $u_q$, $W_k \in R^{D\times D}$ are slices from u. This scheme adds no more computational cost compared to the standard MHA operation, yet it achieves a similar effect as cross-attention and offers good stability during training.

The output from the equilibrium transformer 140, z*, may be decoded and rearranged to generate an image sample $\tilde{x}$ 160 in accordance with equation (10). The decoder 150 may comprise a Layer Normalization component and a linear layer to generate patches $\overline{p} \in R^{N\times D}$. The resulting patches $\overline{p}$ may be rearranged back to the resolution of the input noise e to produce an image sample $\tilde{x} = R^{H\times W\times C}$.

$$\tilde{x} = \text{Decoder}(z^*). \tag{10}$$

FIG. 2 illustrates an example embodiment 200 for generating image samples in accordance with the present disclosure. In FIG. 2, an embedding network 202 embeds noise e into an embedding vector h (not shown) and the embedding vector h is input into an injection transformer. The injection transformer may be, for example, the injection transformer 130 illustrated in FIG. 1. The injection transformer may include one or more GET blocks 214. The embedding vector h may be input into a GET block after a layer normalization component 206 of the GET block. The embedding network 202 may be, for example, the same embedding network 110 shown in FIG. 1. In FIG. 2, the optional (indicated by a dotted box) embedding network 204 embeds class labels y into an embedding vector c and the embedding vector c is input into the injection transformer after the normalization layer 206.

The injection transformer in this embodiment 200 may include one or more GET blocks 214. Each GET block 214 includes layer normalization components 206, 210. Layer normalization is a technique used in deep learning to normalize the activations (output) of a neural network layer. It independently normalizes each training example across its features, reducing dependency on batch size. The layer normalization component 206 receives as input embedding vector h (not shown) from the embedding network 202.

Each GET block 214 includes a multi-head attention ("MHA") component 208. Multi-head attention is a component used in transformer-based models. Attention mechanisms allow models to focus on different parts of the input sequence when making predictions or generating output. Multi-head attention extends this idea by using multiple sets of attention weights, called "attention heads," to capture different types of relationships and information in the input sequence. The MHA component 208 may receive, as an input, the output from the layer normalization component 206. The MHA component 208 may optionally receive, as an input, the embedding vector c.

Each GET block 214 includes a second layer normalization component 210. The layer normalization component 210 may receive, as an input, the output of the MHA component 208.

Each GET block 214 includes a multi-layer perceptron ("MLP") component 212. A MLP may consist of linear layers combined with non-linear activation functions. The linear layers perform transformations that involve weights and biases, while the non-linear activation functions introduce non-linearities into the network. The MLP component 212 may receive, as an input, the output from the second layer normalization component 210.

In FIG. 2, the output n of the injection transformer is input into an equilibrium transformer. The equilibrium transformer may be, for example, the equilibrium transformer 140 illustrated in FIG. 1 and may include one or more GET blocks 220. The equilibrium transformer in FIG. 2 may optionally receive, as an additional input to n, the embedding vector c. As illustrated in FIG. 2, the one or more GET blocks 220 have a similar structure as the GET block 214 in the injection transformer. That is, the GET blocks 220 have a first layer normalization component 222 similar to the layer normalization component 206, a MHA component 224 similar to the MHA component 208, a second layer normalization component 226 similar to the layer normalization component 210, and a MLP component 228 similar to the MLP component 212.

The equilibrium transformer in FIG. 2 solves for the fixed point z*. The fixed point z* may be decoded and rearranged to generate an image sample. For example, the fixed point z* may be provided to a decoder, such as the decoder 150 of FIG. 1, to produce an image sample $\tilde{x}$.

Figure 3:
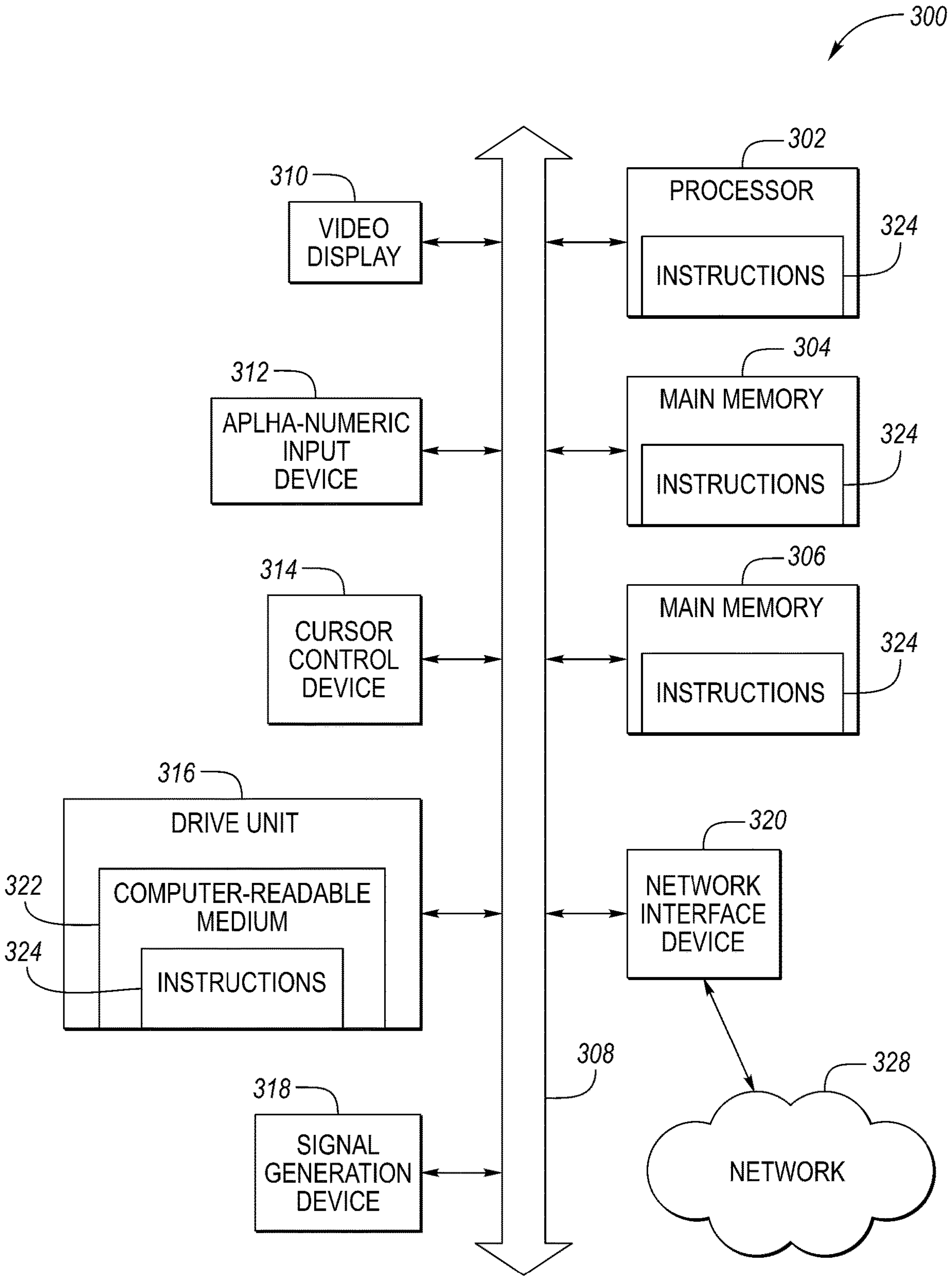
FIG. 3 illustrates an example embodiment of a general computer system in accordance with the present disclosure.

FIG. 3 illustrates an example embodiment of a general computer system 300 in accordance with the present disclosure. The computer system 300 can include a set of instructions that can be executed to cause the computer system 300 to perform any one or more of the methods or computer-based functions disclosed herein. For example, the computer system 300 may include executable instructions to perform functions of the components illustrated in FIG. 1 and FIG. 2. The computer system 300 may be connected to other computer systems or peripheral devices via a network. Additionally, the computer system 300 may include or be included within other computing devices.

As illustrated in FIG. 3, the computer system 300 may include one or more processors 302. The one or more processors 302 may include, for example, one or more central processing units (CPUs), one or more graphics processing units (GPUs), or both. The computer system 300 may include a main memory 304 and a static memory 306 that can communicate with each other via a bus 308. As shown, the computer system 300 may further include a video display unit 310, such as a liquid crystal display (LCD), a projection television display, a flat panel display, a plasma display, or a solid-state display. Additionally, the computer system 300 may include an input device 312, such as a remote-control device having a wireless keypad, a keyboard, a microphone coupled to a speech recognition engine, a camera such as a video camera or still camera, or a cursor control device 314, such as a mouse device. The computer system 300 may also include a disk drive unit 316, a signal generation device 318, such as a speaker, and a network interface device 320. The network interface 320 may enable the computer system 300 to communicate with other systems via a network 328. For example, the network interface 320 may enable the machine learning system 120 to communicate with a database server (not show) or a controller in manufacturing system (not shown).

In some embodiments, as depicted in FIG. 3, the disk drive unit 316 may include one or more computer-readable media 322 in which one or more sets of instructions 324, e.g., software, may be embedded. For example, the instructions 324 may embody one or more of the methods or functionalities, such as the methods or functionalities disclosed herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

In some embodiments, dedicated hardware implementations, such as application specific integrated circuits, programmable logic arrays and other hardware devices, can be constructed to implement one or more of the methods or functionalities described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or functionalities disclosed herein.

In some embodiments, some or all of the computer-readable media will be non-transitory media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium.

Disclosed herein is a Generative Equilibrium Transformer ("GET"), a deep equilibrium vision transformer that is well-suited for single-step generative models. GET's unique architecture allows striking a balance between inference speed and the quality of generated images. Also disclosed herein is a streamlined diffusion distillation process and a disclosure that training directly on noise/image pairs from diffusion models (with the GET architecture) is an effective strategy for distilling a multi-step sampling chain into a one-step generative model, for both class-conditional and unconditional cases. One or more disclosed embodiments show that implicit models for generative tasks can strictly outperform classic networks in terms of performance, model size, model compute, training memory, and speed.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method comprising:

converting noise into a sequence of two-dimensional patches;

producing a noise embedding vector from the sequence of two-dimensional patches;

tokenizing the noise embedding vector via an injection transformer;

inputting the tokenized noise into an equilibrium transformer;

solving a fixed point via the equilibrium transformer; and decoding the fixed point to generate an image sample.

2. The method of claim 1, wherein the injection transformer includes a sequence of injection transformer blocks, the equilibrium transformer includes a sequence of equilibrium transformer blocks differing at an injection interface.

3. The method of claim 2, wherein each transformer block includes:

a first layer normalization component that receives the noise embedding vector;

a second layer normalization component;

a multi-head attention component between the first layer normalization component and the second layer normalization component; and a multi-layer perceptron component.

4. The method of claim 2, wherein the injection interface enables interaction between latent tokens and class embeddings.

5. The method of claim 4, wherein each transformer block includes:

a first layer normalization component that receives the tokenized noise;

a second layer normalization component;

a multi-head attention component between the first layer normalization component and the second layer normalization component; and a multi-layer perceptron component.

6. The method of claim 1, wherein the noise is represented by $e \in R^{H \times W \times C}$ and the two-dimensional patches are represented by $p \in R^{N \times (P^2 \cdot C)}$, where C is a number of channels, P is the size of patch, H and W denote a height and a width of an original image, and $N = HW/P^2$ is a number of the two-dimensional patches.

7. The method of claim 1, further comprising:
converting a class label into a class embedding vector;
inputting the class embedding vector into the injection transformer prior to the tokenizing of the noise embedding vector; and
inputting the class embedding vector into the equilibrium transformer prior to the solving of the fixed point.

8. A non-transitory memory including computer-executable instructions that when executed by a system cause the system to perform operations including:
converting noise into a sequence of two-dimensional patches;
producing a noise embedding vector from the sequence of two-dimensional patches;
tokenizing the noise embedding vector via an injection transformer;
inputting the tokenized noise into an equilibrium transformer;
solving a fixed point via the equilibrium transformer; and
decoding the fixed point to generate an image sample.

9. The memory of claim 8, wherein the injection transformer includes a sequence of injection transformer blocks, the equilibrium transformer includes a sequence of equilibrium transformer blocks differing at an injection interface.

10. The memory of claim 9, wherein each transformer block includes:
a first layer normalization component that receives the noise embedding vector;
a second layer normalization component;
a multi-head attention component between the first layer normalization component and the second layer normalization component; and
a multi-layer perceptron component.

11. The memory of claim 9, wherein the injection interface enables interaction between latent tokens and class embeddings.

12. The memory of claim 11, wherein each transformer block includes:
a first layer normalization component that receives the tokenized noise;
a second layer normalization component;
a multi-head attention component between the first layer normalization component and the second layer normalization component; and
a multi-layer perceptron component.

13. The memory of claim 8, wherein the noise is represented by $e \in \mathbb{R}^{H \times W \times C}$ and the two-dimensional patches are represented by $p \in \mathbb{R}^{N \times (P^2 \cdot C)}$, where C is a number of channels, P is the size of patch, H and W denote a height and a width of an original image, and $N=HW/P^2$ is a number of the two-dimensional patches.

14. The memory of claim 8, wherein the operations further include:
converting a class label into a class embedding vector;
inputting the class embedding vector into the injection transformer prior to the tokenizing of the noise embedding vector; and
inputting the class embedding vector into the equilibrium transformer prior to the solving of the fixed point.

15. A system, comprising:
one or more processors; and
a non-transitory memory including computer-executable instructions that when executed by the one or more processors cause the system to perform operations including:
converting noise into a sequence of two-dimensional patches;
producing a noise embedding vector from the sequence of two-dimensional patches;
tokenizing the noise embedding vector via an injection transformer;
inputting the tokenized noise into an equilibrium transformer;
solving a fixed point via the equilibrium transformer; and
decoding the fixed point to generate an image sample.

16. The system of claim 15, wherein the injection transformer includes a sequence of injection transformer blocks, the equilibrium transformer includes a sequence of equilibrium transformer blocks differing at an injection interface.

17. The system of claim 16, wherein each transformer block includes:
a first layer normalization component that receives the noise embedding vector;
a second layer normalization component;
a multi-head attention component between the first layer normalization component and the second layer normalization component; and
a multi-layer perceptron component.

18. The system of claim 16, wherein the injection interface enables interaction between latent tokens and class embeddings.

19. The system of claim 18, wherein each transformer block includes:
a first layer normalization component that receives the tokenized noise;
a second layer normalization component;
a multi-head attention component between the first layer normalization component and the second layer normalization component; and
a multi-layer perceptron component.

20. The system of claim 15, wherein the noise is represented by $e \in \mathbb{R}^{H \times W \times C}$ and the two-dimensional patches are represented by $p \in \mathbb{R}^{N \times (P^2 \cdot C)}$, where C is a number of channels, P is the size of patch, H and W denote a height and a width of an original image, and $N=HW/P^2$ is a number of the two-dimensional patches.

* * * * *